(12) United States Patent
Nierlich et al.

(10) Patent No.: US 9,028,627 B2
(45) Date of Patent: May 12, 2015

(54) METHOD FOR CASE HARDENING A COMPONENT BY MEANS OF OIL JETS AND DEVICE FOR CARRYING OUT SAID METHOD

(75) Inventors: Wolfgang Nierlich, Schweinfurt (DE); Jurgen Gegner, Furth (DE)

(73) Assignee: AB SKF, Gothenburg (SE)

( * ) Notice: Subject to any disclaimer, the term of this patent is extended or adjusted under 35 U.S.C. 154(b) by 1800 days.

(21) Appl. No.: 11/793,413

(22) PCT Filed: Dec. 3, 2005

(86) PCT No.: PCT/EP2005/012962
§ 371 (c)(1),
(2), (4) Date: May 8, 2008

(87) PCT Pub. No.: WO2006/066717
PCT Pub. Date: Jun. 29, 2006

(65) Prior Publication Data
US 2008/0257458 A1    Oct. 23, 2008

(30) Foreign Application Priority Data

Dec. 21, 2004  (DE) .......................... 10 2004 062 774

(51) Int. Cl.
| | | |
|---|---|---|
| C21D 9/38 | (2006.01) | |
| F16C 33/64 | (2006.01) | |
| C21D 1/30 | (2006.01) | |
| C21D 7/06 | (2006.01) | |

(52) U.S. Cl.
CPC . *F16C 33/64* (2013.01); *C21D 1/30* (2013.01); *C21D 7/06* (2013.01); *C21D 2201/03* (2013.01); *C21D 2211/002* (2013.01); *C21D 2211/008* (2013.01); *C21D 2221/00* (2013.01); *F16C 2240/18* (2013.01)

(58) Field of Classification Search
CPC .............. C21D 1/30; C21D 7/06; F16C 33/64
USPC ....................................................... 148/713
See application file for complete search history.

(56) References Cited

U.S. PATENT DOCUMENTS

| 3,205,556 | A | * | 9/1965 | Romans ....................... 29/90.01 |
| 3,561,239 | A | * | 2/1971 | Tominaga ......................... 72/60 |
| 5,225,008 | A | * | 7/1993 | Koyama et al. ............... 148/580 |
| 5,258,082 | A | | 11/1993 | Koyama et al. |
| 5,592,840 | A | * | 1/1997 | Miyasaka .......................... 72/53 |
| 6,165,053 | A | * | 12/2000 | Yokokawa et al. ............. 451/53 |
| 6,301,766 | B1 | * | 10/2001 | Kolle ........................... 29/421.2 |
| 2003/0176270 | A1 | * | 9/2003 | Gegner ........................ 501/96.2 |
| 2003/0193120 | A1 | * | 10/2003 | Gegner ........................ 266/115 |

FOREIGN PATENT DOCUMENTS

| DE | 39 17 380 A1 | 12/1989 |
| EP | 0 960 950 A1 | 12/1999 |
| JP | 64-72419 A | 3/1989 |
| JP | 7-233411 A | 9/1995 |
| SU | 1 507 801 A1 | 9/1989 |
| SU | 1 507 817 A | 9/1989 |

OTHER PUBLICATIONS

International Search Report (PCT/ISA/210) for PCT/EP2005/012962 dated Apr. 24, 2006.
Written Opinion of the International Search Authority (PCT/ISA/237) for PCT/EP2005/012962, and English translation.
International Preliminary Report on Patentability/Written Opinion (Forms PCT/IB/338, PCT/IB/373 and PCT/ISA/237) mailed Jul. 5, 2007 in corresponding PCT/EP2005/012962, IB of WIPO, Geneva, CH (in English).
Japanese Office Action issued Aug. 21, 2012 by the Japanese Patent Office in corresponding Japanese Application No. 2007-545887 and English language translation thereof.

* cited by examiner

*Primary Examiner* — Jessee Roe
*Assistant Examiner* — Christopher Kessler
(74) *Attorney, Agent, or Firm* — Buchanan Ingersoll & Rooney PC

(57) ABSTRACT

A method for treating a component comprising a metallic or ceramic material with a crystalline, semi-crystalline or amorphous structure. According to the method, to case-harden the component, at least part of the surface of the component is exposed to an oil jet, while the temperature of the oil and/or the component is regulated. Also disclosed is a device for carrying out the method.

15 Claims, No Drawings

METHOD FOR CASE HARDENING A COMPONENT BY MEANS OF OIL JETS AND DEVICE FOR CARRYING OUT SAID METHOD

TECHNICAL FIELD

The invention relates to a process for treating a component and a device for performing the process.

BACKGROUND DISCUSSION

Under certain tribological stress conditions, roller bearing surfaces are prone to cracking. In this case, the initiation of cracks, optionally supported tribochemically, unlike in standard roller fatigue, takes place on the surface of the track itself, and crack propagation results in the peeling off of the affected surface layers. This mechanism has a special meaning in storage that is designed for long operating times.

SUMMARY

One object of this invention is to provide a process for treating a mechanically, in particular dynamically, tribologically and/or corrosively stressed component, so that service lives that are as long as possible are achieved.

A process for treating a component, comprising a material of crystalline, partially crystalline or amorphous structure, i.e., in particular metallic or ceramic, for a surface hardening, i.e., a refining of an area that is near the surface, involves at least a portion of a surface of the component being blasted with an oil jet, whereby oil-blasting is performed with a temperature-controlled oil and/or the component is temperature-controlled.

In this case, the invention is based on the finding that in the cyclic stressing of a component, made of a material of crystalline, partially crystalline or amorphous structure, in ceramic, e.g., controlled by tensile stress, surface cracks with dimple formations can develop, whereby it results especially in a failure, originating from the surface, of a metallic component in the course of damage in a mechanically-induced removal of the residual compressive stresses. With the process disclosed here, residual compressive stresses in the highly-stressed surface of the treated component, which counteract the initiation of cracks and propagation and delay the latter, are built up.

In addition, the invention is based on the finding that in the cyclic stressing of a metallic component, for example the initially described overrunning of the race by the roller body, the increased mobility of dislocations in the material that occurs during operation contributes significantly to the material ageing as an important mechanism of the material fatigue of metallic materials (initially even without metallographically detectable structural changes) and thus ultimately to the failure of the component. With the process disclosed here, an energetically advantageous state of said dislocations is stabilized in this case via processes for dynamic aging of the bar and thus increases the service life. At the same time, a built-up, crack-inhibiting residual compressive stress state is stabilized with no reduction in terms of value.

Since oil-blasting with oil at room temperature associated with a subsequent temperature control of the component is performed with a temperature-controlled oil or with a corresponding temperature control of the component, in particular at temperatures of about 80° C. to 400° C. for the temperature control, the above-mentioned stabilization processes are advantageously promoted. In the case of ceramics, even higher temperatures can be applied. To avoid oil oxidation, the procedure can be performed under a protective gas atmosphere, in particular a nitrogen stream in a suitable housing.

In contrast to shot-blasting or sandblasting, oil-blasting does a considerably better job of preserving a surface composition of very high smoothness that is produced by, for example, honing, whereas during shot-blasting or sandblasting, it could be ground and/or honed to achieve the same surface composition after the blasting, by which in turn a portion of the jet-treated area is disadvantageously ablated again. In contrast to the high-pressure water jets known in engineering, greater depths of material hardening and/or a stronger hardening can be achieved during oil-blasting because of possible temperature effect, which can be detected, for example, in a radiographic analysis of the finished components by measuring the plot of the internal stress depth (also mechanically possible, e.g., borehole process) and can be detected in particular in metallic components also by a corresponding reduction of the half-life width. In addition, a water jet is especially disadvantageous in non-corrosion-resistant materials, in particular non-stainless steel, just because of the danger of corrosion damage.

Other advantages, features and details of the invention will emerge below based on the description of a hot-oil-blasting of a race of a roller bearing, produced from roller bearing steel, as an embodiment of the invention.

DETAILED DESCRIPTION

In an area of an (elastic-)plastic layer, which is directly adjacent to the track surface of the race and which is highly stressed in the operation of the roller bearing, a dislocation-rich structure that is stabilized by substructures is produced because of permanent deformation during the preceding production steps of the race. Hot-oil-blasting of said track surface causes an advantageous residual compressive stress to build up near the surface. Owing to a reduction in dislocation mobility that is comparable to dynamic aging of the bar, moreover, the stabilization of a structure that is resistant to material fatigue also takes place in the affected surface.

In this case, it is movable especially in steel of the interstitially-dissolved carbon in the lattice and can diffuse into the dislocation cores with the formation of so-called Cottrell clouds, which is also referred to as segregation. This atomic arrangement is promoted by energy and therefore counteracts the dislocation movements that occur during the operation of the roller bearing. As a result, the service life of the roller bearing is increased.

With the hot oil-blasting, a stabilization of the crack-inhibiting residual compressive stress state takes place simultaneously, in particular in the highly-stressed surfaces in the operation of the roller bearing. In this case, depending on the setting of the jet parameters (e.g., speed and oil density), compressive internal stresses inhibiting crack propagation with maximum values of several hundred MPa and depth plots up to the range of a few 10 to over 100 μm are produced. Associated dislocation arrangements produced there by preceding hardness treatments (e.g., turning) are advantageously stabilized even at considerable distances from the track surface with only slight temperature- and time-dependent reduction of compressive internal stresses, whereby their maximum values are typically decreased by 10% to 20%.

In this case, suitable temperatures for the hot oil-blasting depend on the material of the race and the heat treatment that is used in the range between 80° C. and 400° C. For a roller bearing steel that is thoroughly hardened or surface-hardened by martensitic means (e.g., carbonization or induction-hardening), the typical range is between 100° C. and 220° C., while, for example, between 100° C. and 300° C. are advantageous for a bainitic steel. In addition, the temperature is naturally also selected by observing the respective measuring stability requirements of the race. If the ring is heated by induction or in a furnace, a higher temperature can also be selected for the short term (e.g., over 10 minutes). Based on the temperature and the respective formation of a unit for performing the hot-oil blasting, it is blasted between about 1 to 30 minutes. As a jet oil, in this case, a suitable, in particular corresponding, temperature-resistant oil, is used.

In this case, oil-blasting is preferably used as the last processing step in connection with a heat treatment and/or a finishing, such as hard turning, hard finished turning, grinding and honing; however, a mechanical post-processing with only narrowly-limited material removal (e.g., honing) can also be carried out for setting a desired surface quality. Since, as previously described, the dislocation state in greater depths under the track surface can also be stabilized by hot oil-blasting because of the aging of the bar, a pre-processing of the race, for example by means of a suitable mechanical processing method (e.g., hard turning), which also sets a suitable internal stress state even in greater depths, results in especially advantageous process results.

A device for performing the hot-oil-blasting comprises holding means for holding the roller bearing ring during blasting and blasting means for delivering the oil-blast. In this case, the holding means are designed, for example, for an inside race, such that they keep the race inside and turn the track past the blasting means for a complete blasting of the track that is arranged on the outside jacket of the race and also make possible a movement in the direction of the main axis of the race. In this case, the blasting means comprise at least one nozzle, in particular in a design as a slit nozzle. In addition, the device comprises heating means for temperature control of the oil and/or the race by means of inductive heating or a furnace. In other embodiments, of course, the blasting means can also be designed to move in at least one direction in space. The device can also make possible oil-blasting under a protective gas atmosphere (e.g., a nitrogen stream) in particular by a suitable housing.

Roller bearings with races and/or roller bodies, which are produced according to the previously described process, can be used in this case to special advantage, for example in gears.

The invention claimed is:

1. Process for treating a component, comprising a material of crystalline, partially crystalline and/or amorphous structure, in which for a surface hardening, at least a portion of a surface of the component is blasted with an oil jet, whereby oil-blasting is performed with a temperature-controlled oil and/or the component is temperature-controlled, the temperature control being exercised at temperatures between 80° C. and 400° C., whereby the component is a race or a roller body of a roller bearing and the material is steel.

2. Process according to claim 1, whereby the oil-blasting takes place at a pressure of greater than 150 bar.

3. Process according to claim 1, whereby the oil-blasting takes place under a protective gas atmosphere.

4. Process according to claim 1, whereby the component is temperature-controlled during and/or after the oil-blasting.

5. Process according to claim 4, whereby temperature control is exercised at temperatures of between 100° C. and 220° C. for the component made from a roller bearing steel that is thoroughly hardened or surface-hardened by martensitic process.

6. Process according to claim 4, whereby temperature control is exercised at temperatures of between 100° C. and 300° C. for the component of a bainitic steel.

7. Process according to claim 1, whereby oil-blasting is performed at a temperature that is less than a temperature control or conversion temperature of a preceding heat treatment of the component.

8. Process according to claim 1, whereby a heat treatment and/or finishing of the component is performed prior to oil-blasting.

9. Process according to claim 8, whereby the finishing comprises hard turning, grinding and/or honing.

10. Process according to claim 1, whereby the steel is a roller bearing steel.

11. Process according to claim 1, whereby the race and/or the roller body comprise tracks that are blasted.

12. Process according to claim 1, whereby after oil-blasting, mechanical treatment of at least a portion of the surface of the component with a removal depth up to at most 15 μm is carried out.

13. Process according to claim 12, further comprising honing the surface of the component.

14. Process for treating a component, comprising a material of crystalline, partially crystalline and/or amorphous structure, in which for a surface hardening, at least a portion of a surface of the component is blasted with an oil jet, whereby oil-blasting is performed with a temperature-controlled oil, the temperature control is exercised at temperatures between 80° C. and 400° C., and the material is steel or a ceramic.

15. Process for treating a component, comprising a material of crystalline, partially crystalline and/or amorphous structure, in which for a surface hardening, at least a portion of a surface of the component is blasted with an oil jet, whereby oil-blasting is performed with a temperature-controlled oil and/or the component is temperature-controlled, the temperature control being exercised at temperatures greater than 80° C., whereby the component is a race or a roller body of a roller bearing and the material is a ceramic.

* * * * *